US008380437B2

(12) United States Patent  
Abousleiman et al.

(10) Patent No.: US 8,380,437 B2  
(45) Date of Patent: Feb. 19, 2013

(54) METHOD OF PREDICTING MECHANICAL PROPERTIES OF ROCKS USING MINERAL COMPOSITIONS PROVIDED BY IN-SITU LOGGING TOOLS

(75) Inventors: Younane Abousleiman, Norman, OK (US); Franz-Josef Ulm, Cambridge, MA (US); Minh H. Tran, Norman, OK (US); Jose Alberto Ortega, Cambridge, MA (US); Christopher Philip Bobko, Raleigh, NC (US); Son K. Hoang, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 373 days.

(21) Appl. No.: 12/106,899

(22) Filed: Apr. 21, 2008

(65) Prior Publication Data  
US 2011/0022320 A1     Jan. 27, 2011

Related U.S. Application Data

(60) Provisional application No. 60/925,471, filed on Apr. 20, 2007.

(51) Int. Cl.  
*G01V 1/40* (2006.01)
(52) U.S. Cl. ............................................. 702/9; 367/73
(58) Field of Classification Search .................. 702/6, 9, 702/11, 12, 2, 33; 367/73; 703/10  
See application file for complete search history.

(56) References Cited

U.S. PATENT DOCUMENTS

| 4,903,527 | A | 2/1990 | Herron |
| 6,718,266 | B1 | 4/2004 | Sinha et al. |
| 7,165,615 | B2 | 1/2007 | Vinegar et al. |
| 7,168,310 | B2 | 1/2007 | Al-Ruwaili |
| 2003/0167835 | A1 | 9/2003 | Sinha et al. |
| 2006/0212225 | A1* | 9/2006 | Bachrach et al. ............... 702/14 |
| 2006/0285437 | A1* | 12/2006 | Sinha et al. ..................... 367/37 |
| 2007/0209799 | A1* | 9/2007 | Vinegar et al. ................ 166/302 |

OTHER PUBLICATIONS

Cheng. 'In-situ permeability determination and fracture characterization using elastic waves'; U.S. Dept. of Energy Report DOE/ER/13636-T2; Published Jan. 1, 1992.  
International Search Report dated Aug. 22, 2008.

* cited by examiner

*Primary Examiner* — Sujoy Kundu  
(74) *Attorney, Agent, or Firm* — Dunlap Codding, P.C.

(57) ABSTRACT

A method for predicting mechanical properties of a transverse isotropic region of a rock formation traversed by a well bore including running a logging tool in the well bore; the mass percentages of minerals present in the rock formation surrounding the well bore are measured with the logging tool. The density of the minerals present in the rock formation surrounding the well bore is determined. The porosity of the rock formation surrounding the well bore is measured. From the porosity and the measured mass percentages and density of the minerals, all the transverse isotropic elastic coefficients of the rock formation are determined in real time.

16 Claims, 10 Drawing Sheets

MOH'S SCALE FOR RELATIVE HARDNESS

| DEPTH | Quartz | Calcite | Dolomite | Pyrite | Illite | Chlorite | Kerogen |
|---|---|---|---|---|---|---|---|
| 109.5 | 67.5 | 0.0 | 0.0 | 4.1 | 22.8 | 0.0 | 5.6 |
| 119.5 | 58.1 | 0.0 | 0.7 | 5.4 | 28.5 | 1.9 | 5.4 |
| 120 | 58.0 | 0.0 | 1.2 | 5.5 | 29.9 | 0.0 | 5.4 |
| 130 | 18.5 | 3.1 | 0.0 | 9.6 | 60.3 | 0.0 | 8.5 |
| 134.5 | 42.9 | 0.0 | 0.0 | 6.9 | 46.5 | 0.0 | 3.6 |
| 139.5 | 47.4 | 0.0 | 4.9 | 5.3 | 33.5 | 4.1 | 4.8 |
| 153.5 | 51.4 | 0.0 | 3.1 | 5.5 | 33.4 | 2.1 | 4.5 |
| 154 | 54.5 | 0.0 | 0.7 | 6.4 | 34.1 | 0.0 | 4.3 |
| 165 | 27.8 | 0.1 | 0.0 | 7.8 | 57.7 | 0.0 | 6.6 |
| 174 | 46.1 | 0.0 | 0.0 | 6.7 | 35.1 | 5.8 | 6.3 |
| 178.5 | 57.3 | 0.0 | 0.0 | 4.4 | 28.6 | 3.8 | 5.9 |
| 184.5 | 45.4 | 0.0 | 0.0 | 4.9 | 45.4 | 0.0 | 4.3 |
| 189 | 47.3 | 0.0 | 2.4 | 4.8 | 33.0 | 6.1 | 6.4 |
| 199.5 | 58.3 | 0.0 | 1.6 | 4.3 | 28.7 | 1.0 | 6.0 |

Fig. 5

| Depth (ft-in) | Quartz | Ksp | Plag | Calc | Dolo | Ankerite | Pyr + Marcasite | Kaol | Chlor | Sum 2:1, clay + mica | Kerogen |
|---|---|---|---|---|---|---|---|---|---|---|---|
| 109' - 5.7" | 53 | 2 | 1 | 1 | 0 | 2 | 3 | 0 | 0 | 20 | 18 |
| 119' - 4.25" | 63 | 1 | 1 | 9 | 0 | 3 | 5 | 0 | 0 | 5 | 13 |
| 119' - 11.75" | 36 | 0 | 0 | 28 | 0 | 10 | 20 | 0 | 0 | 2 | 4 |
| 130' | 37 | 2 | 3 | 0 | 0.5 | 2 | 9 | 1 | 3 | 26 | 16.4 |
| 134' - 7" | 35 | 2 | 2 | 0.5 | 4 | 16 | 2 | 0 | 2 | 23 | 13.5 |
| 139' - 6" | 34 | 2 | 2 | 0 | 0 | 7 | 0 | 0 | 3 | 27 | 16 |
| 153' - 3.5" | 36 | 2 | 3 | 0 | 4 | 5 | 4 | 0 | 3 | 29 | 14 |
| 154' | 31 | 0.5 | 3 | 0 | 3 | 4 | 13 | 0 | 3 | 25 | 17.5 |
| 165' | 33 | 2 | 3 | 0 | 1 | 2 | 10 | 0 | 4 | 27 | 18 |
| 174' - 0.5" | 34 | 2 | 3 | 0 | 0 | 7 | 6 | 0 | 5 | 31 | 12 |
| 178' - 5" | 44 | 1 | 2 | 11 | 0 | 2 | 7 | 5 | 0 | 13 | 15 |
| 184' - 10.0" | 27 | 2 | 3 | 0 | 6 | 8 | 3 | 3 | 4 | 29 | 14 |
| 188' - 11.5" | 36 | 1 | 4 | 0 | 0 | 4 | 1 | 0 | 3 | 40 | 11 |
| 199' - 9.7" | 39 | 1 | 3 | 3 | 2 | 4 | 7 | 3 | 2 | 21 | 15 |

Fig. 6

| MINERALOGY FROM XRD | | MINERALOGY FROM ECS LOG | |
|---|---|---|---|
| Mineral | Mass Percentage | Mineral | Mass Percentage |
| Quartz | 36 | Quartz | 47.3 |
| Kspar | 1 | Kspar | 0 |
| Plagioclase | 4 | Plagioclase | 0 |
| Calcite | 0 | Calcite | 0 |
| Dolomite | 0 | Dolomite | 2.4 |
| Ankerite | 4 | Ankerite | 0 |
| Pyrite + Marcasite | 1 | Pyrite + Marcasite | 4.8 |
| Kaolinite | 0 | Kaolinite | 0 |
| Chlorite | 3 | Chlorite | 6.1 |
| Sum 2:1, clay + mica | 40 | Sum 2:1, clay + mica | 33 |
| Kerogen | 11 | Kerogen | 6.4 |

Fig. 7

$$\begin{bmatrix} 16.3 & 5.9 & 6.2 & 0 & 0 & 0 \\ 5.9 & 16.3 & 6.2 & 0 & 0 & 0 \\ 6.2 & 6.2 & 9.5 & 0 & 0 & 0 \\ 0 & 0 & 0 & 2.3 & 0 & 0 \\ 0 & 0 & 0 & 0 & 2.3 & 0 \\ 0 & 0 & 0 & 0 & 0 & 5.2 \end{bmatrix} \qquad \begin{bmatrix} 22.0 & 7.9 & 8.3 & 0 & 0 & 0 \\ 7.9 & 22.0 & 8.3 & 0 & 0 & 0 \\ 8.3 & 8.3 & 12.9 & 0 & 0 & 0 \\ 0 & 0 & 0 & 3.0 & 0 & 0 \\ 0 & 0 & 0 & 0 & 3.0 & 0 \\ 0 & 0 & 0 & 0 & 0 & 7.0 \end{bmatrix}$$

Stiffness Matrix (GPa) from
ECS log Mineralogy Results

Stiffness Matrix (GPa) from
XRD Mineralogy Results

| Mineralogy from XRD ||
|---|---|
| Mineral | Mass Percentage |
| Quartz | 27 |
| Kspar | 2 |
| Plagioclase | 3 |
| Calcite | 0 |
| Dolomite | 6 |
| Ankerite | 8 |
| Pyrite + Marcasite | 3 |
| Kaolinite | 3 |
| Chlorite | 4 |
| Sum 2:1, clay + mica | 29 |
| Kerogen | 14 |

Fig. 10

$$\begin{bmatrix} 21.2 & 6.4 & 8.2 & 0 & 0 & 0 \\ 6.4 & 21.2 & 8.2 & 0 & 0 & 0 \\ 8.2 & 8.2 & 13.8 & 0 & 0 & 0 \\ 0 & 0 & 0 & 4.9 & 0 & 0 \\ 0 & 0 & 0 & 0 & 4.9 & 0 \\ 0 & 0 & 0 & 0 & 0 & 7.4 \end{bmatrix}$$

Stiffness Matrix
(GPa) from UPV

Fig. 11A

$$\begin{bmatrix} 22.0 & 7.9 & 8.3 & 0 & 0 & 0 \\ 7.9 & 22.0 & 8.3 & 0 & 0 & 0 \\ 8.3 & 8.3 & 12.9 & 0 & 0 & 0 \\ 0 & 0 & 0 & 3.1 & 0 & 0 \\ 0 & 0 & 0 & 0 & 3.1 & 0 \\ 0 & 0 & 0 & 0 & 0 & 7.0 \end{bmatrix}$$

Simulated Stiffness Matrix
(GPa) from XRD Mineralogy Results

Fig. 11B

$$\begin{bmatrix} N/A & N/A & N/A & 0 & 0 & 0 \\ N/A & N/A & N/A & 0 & 0 & 0 \\ N/A & N/A & N/A & 0 & 0 & 0 \\ 0 & 0 & 0 & 3.2 & 0 & 0 \\ 0 & 0 & 0 & 0 & 3.2 & 0 \\ 0 & 0 & 0 & 0 & 0 & 5.4 \end{bmatrix}$$

Stiffness Matrix
(GPa) from Sonic log

Fig. 11C

| Calculated Moduli from UPV | Simulated Moduli from XRD Mineralogy Results | Moduli from Sonic Log |
|---|---|---|
| $E_H$ = 16.2 (GPa) | $E_H$ = 16.3 ± 2.8 (GPa) | $E_H$ = N/A |
| $E_V$ = 9.0 (GPa) | $E_V$ = 8.3 ± 1.5 (GPa) | $E_V$ = 8.5 (GPa) |
| $\upsilon_H$ = 0.1 | $\upsilon_H$ = 0.15 ± 0.001 | $\upsilon_H$ = N/A |
| $\upsilon_V$ = 0.29 | $\upsilon_V$ = 0.27 ± 0.0013 | $\upsilon_V$ = 0.32 |
| G - 4.9 (GPa) | G - 3.1 ± 0.56 (GPa) | G = 3.4 (GPa) |

Fig. 12

| Mineralogy from XRD ||
|---|---|
| Mineral | Mass Percentage |
| Quartz | 33 |
| Kspar | 2 |
| Plagioclase | 3 |
| Calcite | 0 |
| Dolomite | 1 |
| Ankerite | 2 |
| Pyrite + Marcasite | 10 |
| Kaolinite | 0 |
| Chlorite | 4 |
| Sum 2:1, clay + mica | 27 |
| Kerogen | 18 |

Fig. 13

$$\begin{bmatrix} 23.8 & 6.4 & 7.9 & 0 & 0 & 0 \\ 6.4 & 23.8 & 7.9 & 0 & 0 & 0 \\ 7.9 & 7.9 & 14.9 & 0 & 0 & 0 \\ 0 & 0 & 0 & 5.3 & 0 & 0 \\ 0 & 0 & 0 & 0 & 5.3 & 0 \\ 0 & 0 & 0 & 0 & 0 & 8.7 \end{bmatrix}$$

Stiffness Matrix
(GPa) from UPV

Fig. 14A

$$\begin{bmatrix} 29.9 & 10.35 & 11.2 & 0 & 0 & 0 \\ 10.35 & 29.9 & 11.2 & 0 & 0 & 0 \\ 11.2 & 11.2 & 17.7 & 0 & 0 & 0 \\ 0 & 0 & 0 & 4.4 & 0 & 0 \\ 0 & 0 & 0 & 0 & 4.4 & 0 \\ 0 & 0 & 0 & 0 & 0 & 9.7 \end{bmatrix}$$

Simulated Stiffness Matrix
(GPa) from XRD Mineralogy Results

Fig. 14B

$$\begin{bmatrix} N/A & N/A & N/A & 0 & 0 & 0 \\ N/A & N/A & N/A & 0 & 0 & 0 \\ N/A & N/A & N/A & 0 & 0 & 0 \\ 0 & 0 & 0 & 3.6 & 0 & 0 \\ 0 & 0 & 0 & 0 & 3.6 & 0 \\ 0 & 0 & 0 & 0 & 0 & 5.5 \end{bmatrix}$$

Stiffness Matrix
(GPa) from Sonic log

Fig. 14C

| Calculated Moduli from UPV | Simulated Moduli from XRD Mineralogy Results | Moduli from Sonic Log |
|---|---|---|
| $E_H = 19.3$ (GPa) | $E_H = 23.0 \pm 2.5$ (GPa) | $E_H = N/A$ (GPa) |
| $E_V = 10.8$ (GPa) | $E_V = 12 \pm 3.0$ (GPa) | $E_V = 10.4$ (GPa) |
| $\upsilon_H = 0.11$ | $\upsilon_H = 0.15 \pm 0.0018$ | $\upsilon_H = N/A$ |
| $\upsilon_V = 0.26$ | $\upsilon_V = 0.27 \pm 0.0015$ | $\upsilon_V = 0.3$ |
| $G = 5.27$ (GPa) | $G = 4.5 \pm 0.7$ (GPa) | $G = 3.6$ (GPa) |

Fig. 15

METHOD OF PREDICTING MECHANICAL PROPERTIES OF ROCKS USING MINERAL COMPOSITIONS PROVIDED BY IN-SITU LOGGING TOOLS

CROSS REFERENCE TO RELATED APPLICATIONS

This application claims benefit of U.S. Provisional Application No. 60/925,471, filed Apr. 20, 2007, which is incorporated herein by reference in its entirety.

BACKGROUND OF THE INVENTION

1. Field of the Invention

This invention relates generally to a method for predicting mechanical properties of rocks using the mineral compositions of the rocks which are provided by in-situ logging tools.

2. Brief Description of Related Art

Formations in the earth are characterized by stress conditions which vary with depth and whose principal directions are generally vertical and horizontal. In the horizontal plane at any point, the horizontal stress reaches a maximum in one direction and a minimum at right angles to the maximum condition. Information concerning these maximum and minimum horizontal stress conditions is of substantial value in a variety of disciplines such as underground transportation systems, foundations of major structures, cavities for storage of liquids, gases or solids, and in prediction of earthquakes. Further, this information is essential in petroleum exploration and production, e.g., while drilling a well or borehole the information is useful for blowout prevention, in a completed well it is useful for evaluating hydraulic fracture treatment, and also in determining many critically important aspects of reservoir behavior, such as bulk and pore volume compressibility, permeability, direction of fluid flow, and reservoir compaction/surface subsidence.

Mechanical properties of formation rocks include stiffness coefficients, Young's modulus in an isotropic plane, Young's modulus in direction normal to the isotropic plane, Poisson's ratio in the isotropic plane, Poisson's ratio in a direction normal to the isotropic plane, and shear modulus. Such intrinsic rock properties are important pieces of information needed to properly interpret and model in-situ reservoir behavior.

Traditional techniques for determining rock properties include analysis of core samples. This involves the need to obtain and bring the core samples to the surface which can be a costly operation. To this end, a need exists for an improved method for predicting mechanical properties of rocks using the mineral compositions of the rocks ascertained from in-situ logging tools. It is to such a method that the present invention is directed.

BRIEF DESCRIPTION OF THE DRAWINGS

FIG. 14A is a stiffness matrix determined from UPV results.

FIG. 14B is a stiffness matrix determined from XRD results.

FIG. 14C is a stiffness matrix determined from sonic log results.

FIG. 15 is a table showing the comparison of engineering moduli.

DETAILED DESCRIPTION OF EXEMPLARY EMBODIMENTS

The present invention is directed to a method for predicting mechanical properties of rocks using the mineral compositions of the rocks ascertained from in-situ geochemical logging tools. Relative elemental yields are measured with the geochemical logging tool. Mineralogy information, type of mineral present, and mass percentages of each mineral is obtained through established correlations. Certain mechanical properties of the rocks are calculated based on the obtained mineralogy information.

Figure 1:
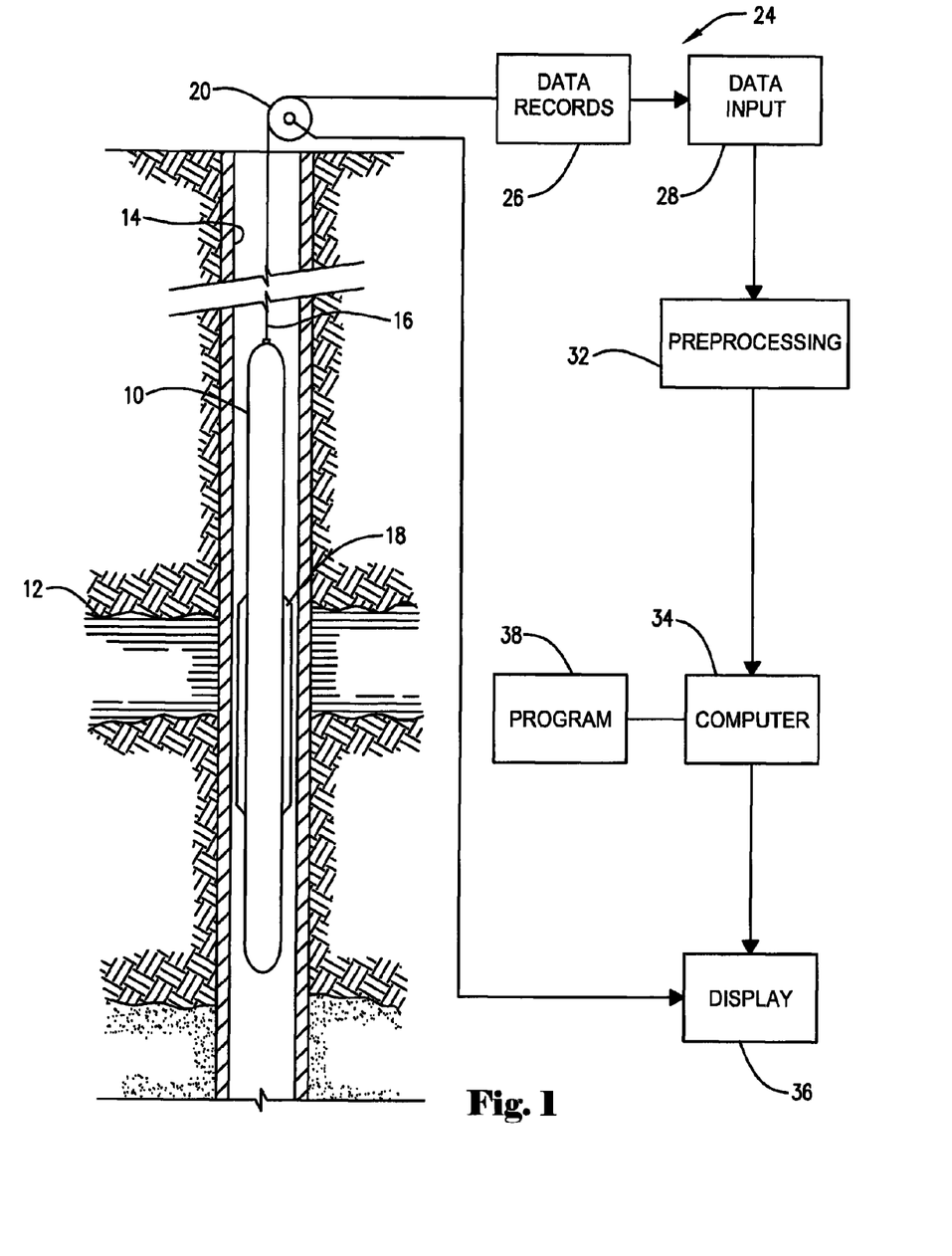
FIG. 1 is a schematic diagram, taken partly in cross-section, of a well logging tool disposed in a well bore.

Referring to FIG. 1, a logging tool 10 which can be used in practicing embodiments of the present invention is shown. Subsurface formations 12 are traversed by a well bore 14 which is typically, although not necessarily, filled with drilling fluid or mud. The logging tool 10 is suspended on an armored cable 16 and may have optional centralizers 18. The cable 16 extends up the well bore 14, over a sheave wheel 20 on a derrick (not shown) to a winch forming part of surface equipment 24. Known depth gauging apparatus (not shown) is provided to measure cable displacement over the sheave wheel 20 and accordingly the depth of the logging tool 10 in the well bore 14. A device of a type well known in the art is included in the logging tool 10 to produce a signal indicative of orientation of the body of the logging tool 10. Processing and interface circuitry within the logging tool 10 amplifies, samples and digitizes the tool's information signals for transmission and communicates them to the surface equipment 24 via the cable 16. Electrical power and control signals for coordinating operation of the tool 10 are generated by the surface equipment 24 and communicated via the cable 16 to circuitry provided within the tool 10.

It is preferable with the present invention that the following types of well logging measurements be obtained from the subsurface formations 12: a pulsed neutron spectroscopy log and a porosity log. While it is preferred that the logging tool 10 contain all the necessary logging instruments to obtain the needed data in one logging run, it should be understood that the logging tool 10 need not contain all of these logging instruments, and may contain one or more of such instruments. In the latter case, sufficient logging passes are made with different well logging tools to obtain well logging measurements of all desired types for formation depths of interest.

Pulsed neutron spectroscopy logging tools are capable of measuring relative elemental yields based on neutron-induced capture gamma ray spectroscopy. The primary elements measured in both open and cased holes are for the formation elements silicon (Si), iron (Fe), calcium (Ca), sulfur (S), titanium (Ti), and gadolinium (Gd), chlorine (Cl), barium (Ba) and hydrogen (H). One suitable tool is commercially available from Schlumberger and known as Elemental Capture Spectroscopy (ESC). Another tool which is suitable for use is a pulsed neutron tool commercially available from Baker-Atlas and is sold under the trademark Formation Lithology Explorer™. This tool when used is used in combination with a natural gamma ray Spectralog II to permit the mineralogy to be determined. It will be understood, however, that any suitable logging device can be utilized.

Porosity of the rock formation may be determined from any suitable log, such as density, neutron, sonic, or nuclear magnetic resonance, or any other conventional logging instrument, or combinations thereof, which can be used to measure porosity of formations surrounding a well bore.

During the well logging runs, the well logging measurements obtained by the well logging tool 10 are recorded as functions of well bore depth in a suitable data memory 26. Once recorded, the well logging data measurements may be transferred as needed into a data input unit 28 of a data processing system. The well logging data measurements may optionally be subjected to conventional preprocessing in a preprocessing unit 32 and are precessed by a computer 34 according to the present invention in a manner to be set forth below. The processed results from computer 34 are then available for analysis on a suitable output unit 36, such as a display or plotter.

The computer 38 can be a mainframe computer of any conventional type of suitable processing capacity. Other digital processors, however, may be used, such as a laptop computer, or any other suitable processing apparatus. In any case, the processor of the computer 34 accesses the well logging data measurements to undertake the instructions of the present invention, which may be executed by a processor as a series of computer-executable instructions. The instructions may be contained on a data storage device 38 with a computer readable medium, such as a computer diskette having a computer usable medium stored thereon. Or, the instructions may be stored in memory of the computer 34, or on magnetic tape, conventional hard disk drive, electronic read-only memory, optical storage device, or other appropriate data storage device. Further, it should be understood that the computer 38 can be located either at the well site or remote therefrom and the computer 38 can be any suitable architecture. For example, the computer 38 can be either be a single computer system or a distributed computer system.

Mechanical properties of formation rocks include stiffness coefficients, Young's modulus in an isotropic plane, Young's modulus in direction normal to the isotropic plane, Poisson's ratio in the isotropic plane, Poisson's ratio in a direction normal to the isotropic plane, and shear modulus. Such intrinsic rock properties are critical pieces of information needed to properly interpret and model in-situ reservoir behavior.

Figure 2:
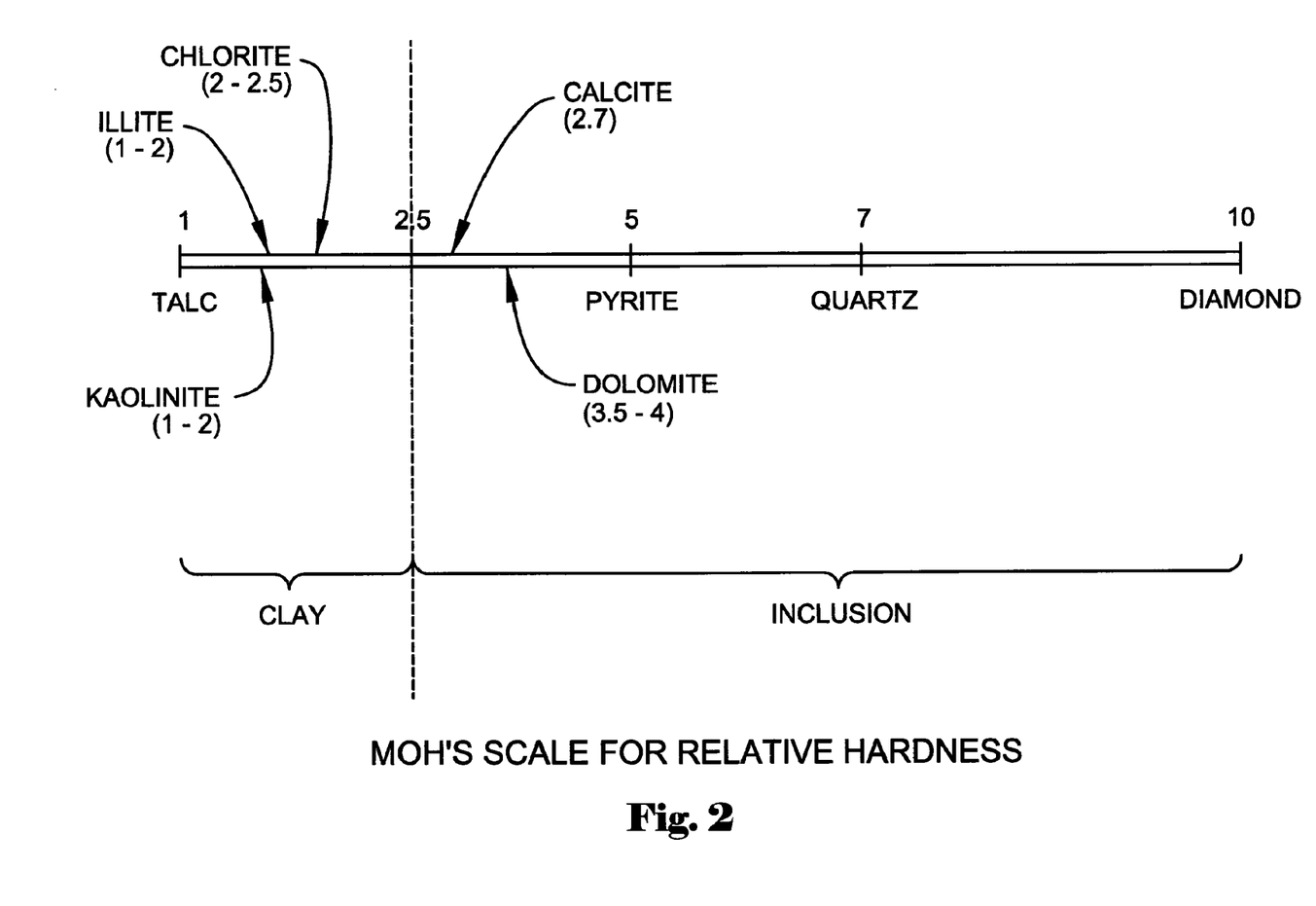
FIG. 2 is a graphical representation of a hardness scale.

It has been observed that the lithology of rock formations includes minerals that are generally classified as clay, and minerals that are generally classified as inclusion (non-clay materials). Clay particles are sheet-like and settle horizontally, and thus exhibit transversely isotropic characteristics. Clay is characterized by a platy shape and has a hardness below 2.5 on the Mohs scale (FIG. 2). Inclusion generally has a non-platy shape or a hardness above 2.5 on the Mohs scale. The stiffness of rocks is a function of the amount of inclusion in the matrix and how tightly the clay is packed: $[\sigma]=[C(f_{inc},\eta)][\epsilon]$, where $\sigma$ is stress, C is a set of constants which are material dependent, $f_{inc}$ is inclusion volume fraction, $\eta$ is clay packing density, and $\epsilon$ is strain.

Transversely isotropic materials are those that have the same properties in one plane and different properties on an axis perpendicular to that plane. Hooke's Law is expressed as $\sigma=C\epsilon$, where $\sigma$ is stress, C is a set of constants which are material dependent, and $\epsilon$ is strain. For transversely isotropic material, Hooke's law is expressed as:

$$\begin{matrix}\text{Stress} \\ \text{matrix}\end{matrix} \quad\quad \begin{matrix}\text{Stiffness matrix}\end{matrix} \quad\quad \begin{matrix}\text{Strain} \\ \text{matrix}\end{matrix} \quad (1)$$

$$\begin{bmatrix} \sigma_{11} \\ \sigma_{22} \\ \sigma_{33} \\ \sigma_{12} \\ \sigma_{13} \\ \sigma_{23} \end{bmatrix} = \begin{bmatrix} C_{11} & C_{12} & C_{13} & 0 & 0 & 0 \\ C_{12} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{55} \end{bmatrix} \begin{bmatrix} \varepsilon_{11} \\ \varepsilon_{22} \\ \varepsilon_{33} \\ 2\varepsilon_{12} \\ 2\varepsilon_{13} \\ 2\varepsilon_{23} \end{bmatrix}$$

The stiffness coefficients ($C_{11}$, $C_{12}$, $C_{13}$, $C_{33}$, $C_{44}$, and $C_{55}$) in the stiffness matrix are rock mechanical properties that are desired to be known.

Stiffness coefficients, such as $C_{11}$, $C_{12}$, $C_{13}$, $C_{33}$, $C_{44}$, and $C_{55}$, may also be expressed in equivalent engineering terms:

$$E_H = \frac{C_{11}^2 C_{33} - C_{12} C_{33} - 2C_{11} C_{13}^2 + 2C_{12} C_{13}^2}{C_{11} C_{33} - C_{13}^2} \quad (2)$$

$$E_V = \frac{C_{11} C_{33} - C_{13} + C_{12} C_{13}}{C_{11} + C_{12}} \quad (3)$$

$$v_H = \frac{C_{12} C_{33} - C_{13}^2}{C_{11} C_{33} - C_{13}^2} \quad (4)$$

$$v_V = \frac{C_{13}}{C_{11} + C_{12}} \quad (5)$$

$$G = C_{44} \quad (6)$$

where $E_H$=Youngs' Modulus in isotropic plane, $E_v$=Young's modulus in direction normal to isotropic plane, $V_H$=Poisson's ratio in isotropic plane, $V_v$=Poisson's ratio in direction normal to isotropic plane, and G=shear modulus.

Figure 3:
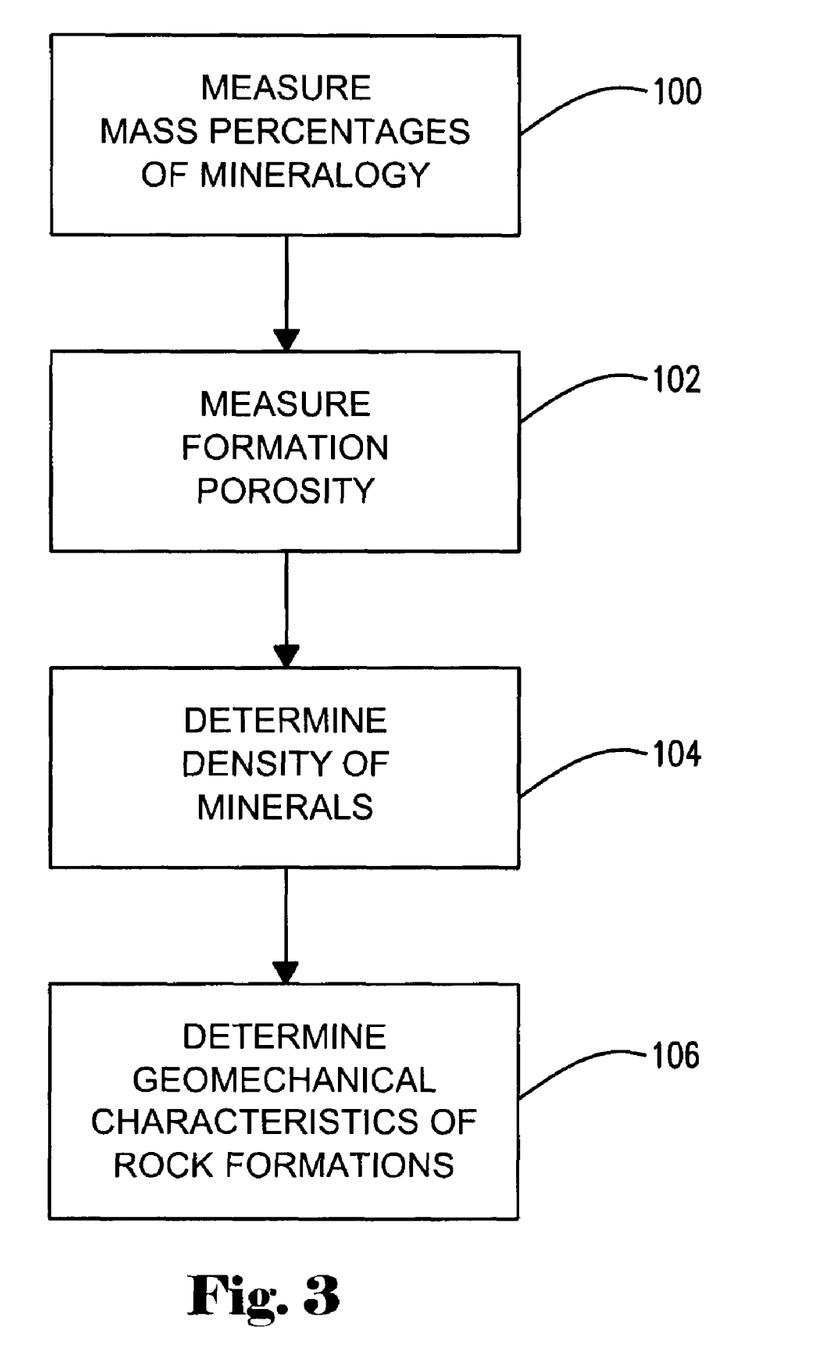
FIG. 3 is a block diagram of processing steps according to the present invention.

With reference to FIG. 3, there is depicted a logic flowchart illustrating a method of obtaining a measure of mechanical properties of a transverse isotropic region of rock formations traversed by a well bore. The method of the present invention performed in the computer 34 of the well logging system can be implemented utilizing the computer program steps of FIG. 3 stored in memory 38 and executable by system processor of computer 34 and also the data resulting from the other steps of FIG. 3 not implemented by the computer 34. Such data is furnished to computer 34 through any suitable form of computer data input device.

In the method depicted in FIG. 3, the process of the present invention begins at process step 100. The initial process step 100 involves characterizing or describing the formation lithology of interest as clay and inclusion with the results obtained from the logging tool 10. More specifically, the mass percentages of the minerals present in the rock formation is measured. According to the present invention, clay comprises clay minerals, i.e., montmorillonite, illite, chlorite and kaolinite. Inclusion comprises anything that is neither clay nor fluid, e.g., quartz, mica and feldspar, organics, and any other possible component.

Next, during a step 102 the most appropriate cross-plots and transforms are used to obtain the formation total porosity D. The cross-plots and transforms so used are determined from the available porosity logs from the well logging system of FIG. 1 such as density, neutron and sonic logs. Corrections for environmental (borehole size and fluids) and light-hydrocarbon effects may, if necessary, need to be applied upon these logs to enable more accurate total porosity results.

Processing step 104 is next, and is done to determine the density of the clay and the density of the inclusion. Processing step 104 may be performed by estimating clay volume and inclusion volume from prevailing knowledge and experience about the dominant mineral types in geological units or formations of interest.

With the information obtained during processing steps 100, 102, and 104, process step 106 is carried out to compute the geomechanical properties of the rock formation. A set of elastic coefficients, such as $C_{11}$, $C_{12}$, $C_{13}$, $C_{33}$, $C_{44}$, and $C_{55}$, are determined using the following equations:

$$C_{11}^{UPV} = \frac{\begin{bmatrix} -41063144.69 + 97351552.06 f_{inc}\eta^2 - \\ 261604130.8 f_{inc}\eta + 10646177.4 f_{inc} + \ldots \\ \ldots + 22645232.18 f_{inc}^2\eta^3 - 131319400.3 f_{inc}^2\eta^2 + \\ 196461765.7 f_{inc}^2\eta - \ldots \\ \ldots 68231686.74 f_{inc}^2 + 82126289.39\eta \end{bmatrix}}{[(56.28 f_{inc}\eta + 88.6 - 116.74 f_{inc})D_1]} \quad (7)$$

$$C_{33}^{UPV} = \frac{(2\eta-1)\begin{pmatrix} 201183.6548 f_{inc}\eta + \\ 266765.0620 - 367356.8894 f_{inc} \end{pmatrix}}{D_1} \quad (8)$$

$$C_{13}^{UPV} = \frac{(2\eta-1)\begin{pmatrix} 17358.98287 f_{inc}\eta + \\ 182175.1211 - 190854.6125 f_{inc} \end{pmatrix}}{D_1} \quad (9)$$

$$C_{44}^{UPV} = 265.3127\frac{(2\eta-1)}{11.978 f_{inc}\eta - 50.289 f_{inc} + 44.3} \quad (10)$$

$$C_{66}^{UPV} = 1246.602\frac{(2\eta-1)}{(56.280 f_{inc}\eta + 88.6 - 116.74 f_{inc})} \quad (11)$$

$$C_{12}^{UPV} = C_{11}^{UPV} - 2C_{66}^{UPV} \quad (12)$$

$$D_1 = 10073.82886 + 16755.54231 f_{inc}\eta - 28525.42887 f_{inc} + \\ 4149.541128 f_{inc}^2\eta^2 - \ldots 20905.08344 f_{inc}^2\eta + 19488.98529 f_{inc}^2 \quad (13)$$

$$\text{where } f_{inc} = (1-\phi)\frac{\sum_i m_i/d_i}{\sum_i m_i/d_i + \sum_c m_c/d_c} = \frac{V_i}{V_{bulk}} \quad (14)$$

$F_{inc}$: Inclusion volume fraction
$\Phi$: Intrinsic Total Porosity
$m_i$: Mass percentage of inclusion
$m_c$: Mass percentage of clay
$d_i$: Density of inclusion
$d_c$: Density of clay
$V_i$: Inclusion volume
$V_b$: Bulk volume $$\text{and where } \eta = 1 - \frac{\phi}{1-f_{inc}} = \frac{V_c}{V_c + V_p} \quad (15)$$

$\eta$: Clay packing density
$\Phi$: Intrinsic Total Porosity
$F_{inc}$: Inclusion volume fraction
$V_c$: Clay volume
$V_p$: Pore volume With the present invention, the disadvantages of conventional rock properties evaluation related to stiffness have been overcome by the methodology of this invention. The present invention accurately quantifies certain rock properties using in-situ logging tools without requiring the costly and time intensive analysis of core samples. The present invention has positive and valuable merits for formation evaluation. It uses well logging data in real time to accurately quantify rock mechanical properties.

The methodology of the present invention for formation evaluation has been tested in a shaly-sand formation. The results were compared to actual formation data such as core-XRD data, and core-porosity data. The results of the present invention were found to be correlated to actual data. By using the present invention, interested parties will be able to assess hydrocarbon reserves more accurately and make cost-effective decisions and plans for completing and producing wells.

EXAMPLE

The Woodford shale is emerging as a major gas formation in the United States. Despite tremendous potential, existing data on the Woodford shale geomechanics characterization are limited. In this example, a well in the Woodford shale formation, 200 feet deep, was cored and logged in Oklahoma, USA. A suite of logs, including an ESC log and a sonic log, were run in the well. Mineralogy quantification was conducted by XRD and ultra pulse velocity (UPV) on the obtained core samples at random depths.

Figure 4:
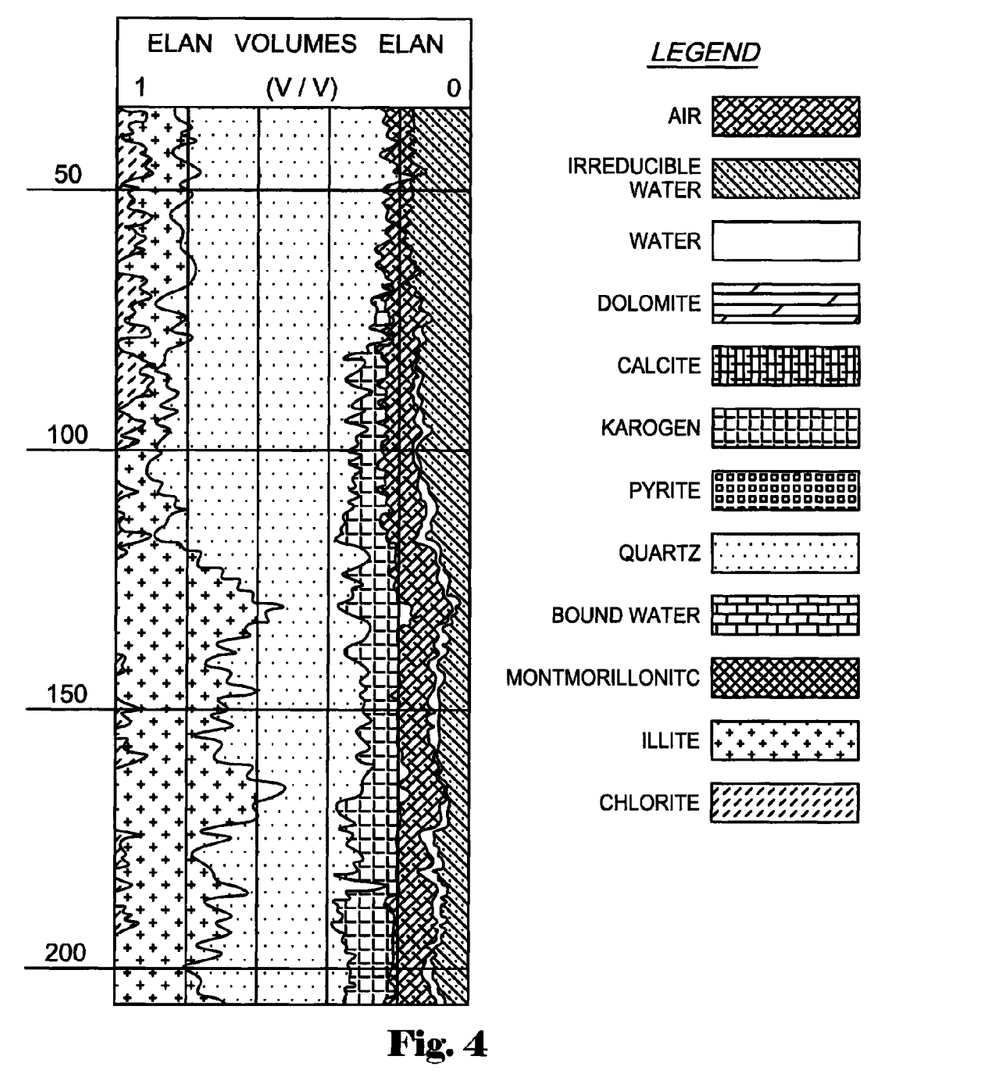
FIG. 4 is a plot of an ESC well log of formation lithology obtained as a function of well bore depth.
Figure 5:
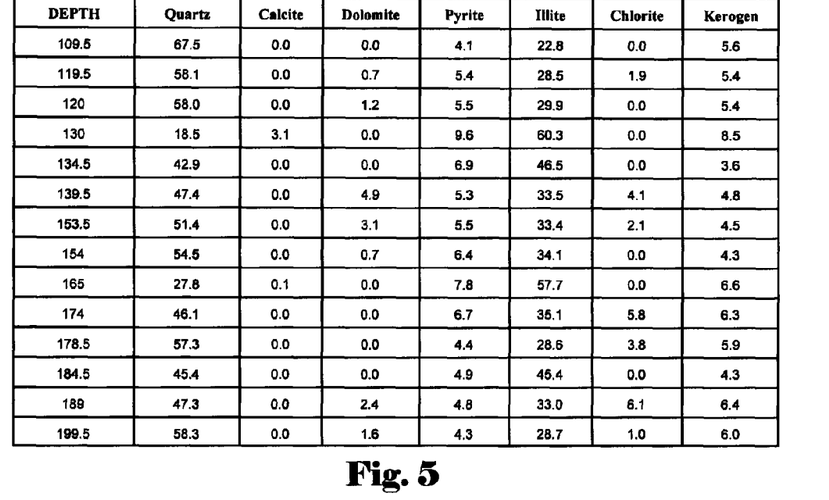
FIG. 5 is a table of ESC logs results.
Figure 6:
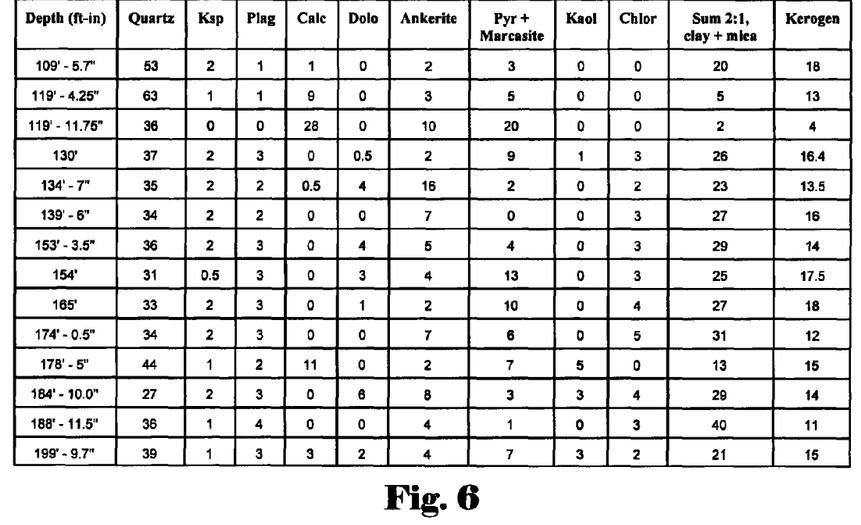
FIG. 6 is a table of the XRD results from core samples.
Figure 7:
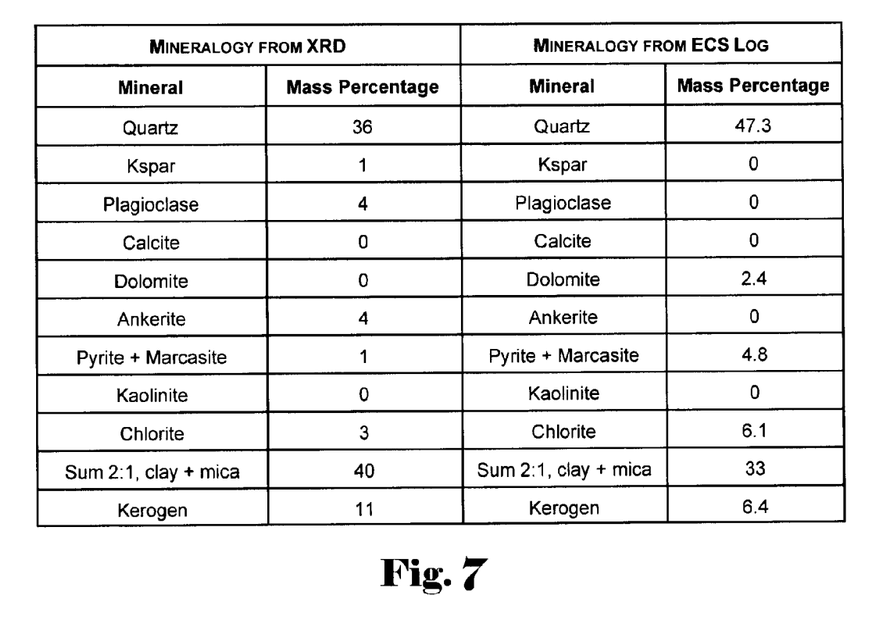
FIG. 7 is a table showing mass percentage of mineralogy obtained from XRD results and an ESC log.
Figure 8:
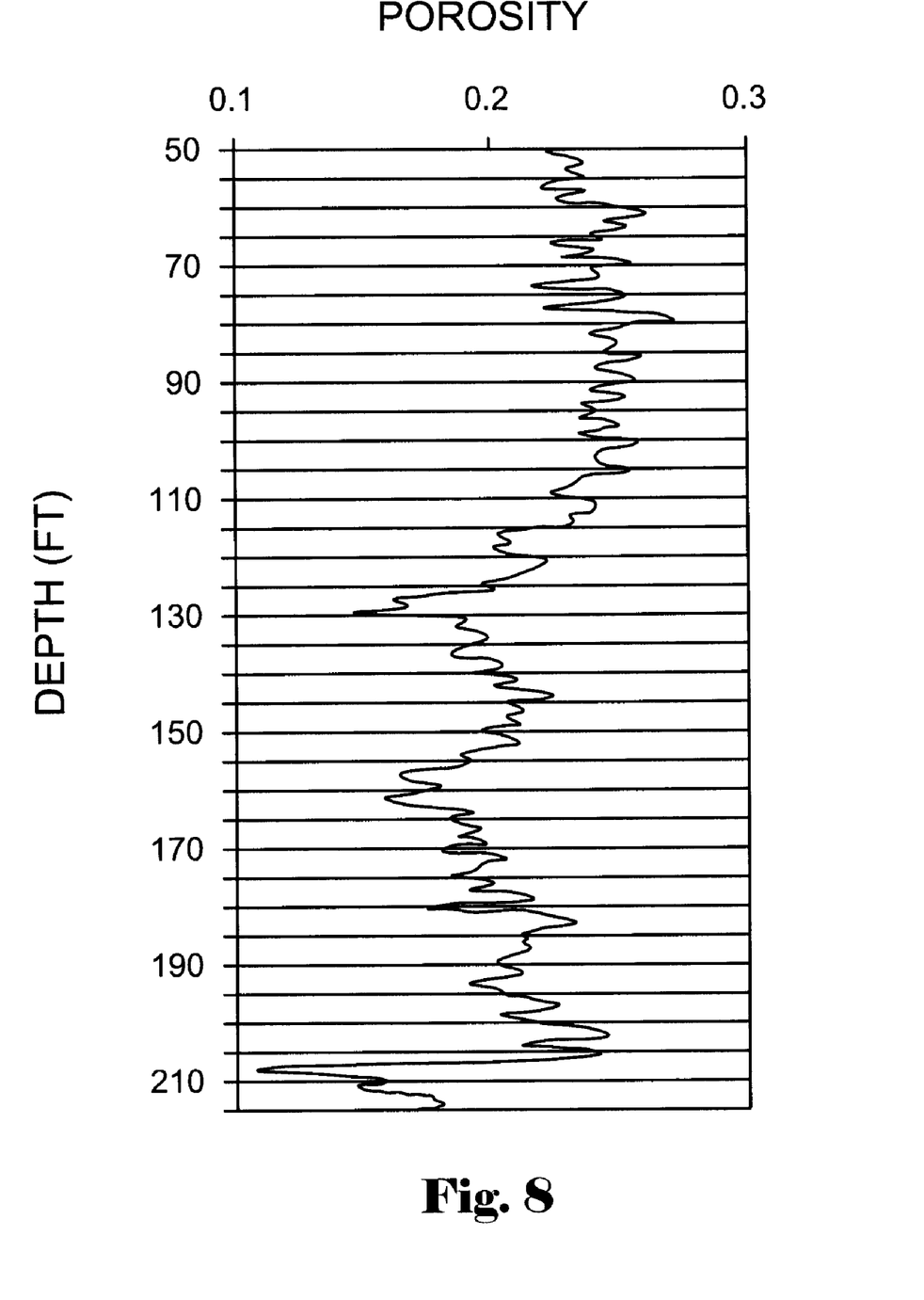
FIG. 8 is a plot of a well log of formation porosity as a function of well bore depth.

At a depth of 188 ft. 11.5 inches, the mineralogy quantification from XRD and the ESC log were compared. FIG. 4 shows the ESC log result of the Woodford shale as a function of depth. FIG. 5 is a table of the ESC log results for specific depths. FIG. 6 a table of the XRD results from the same depths. FIG. 7 is a table showing mass percentage of mineralogy from the XRD results and the ESC log. FIG. 8 shows the effective porosity of the formation as a function of depth.

Figure 9:
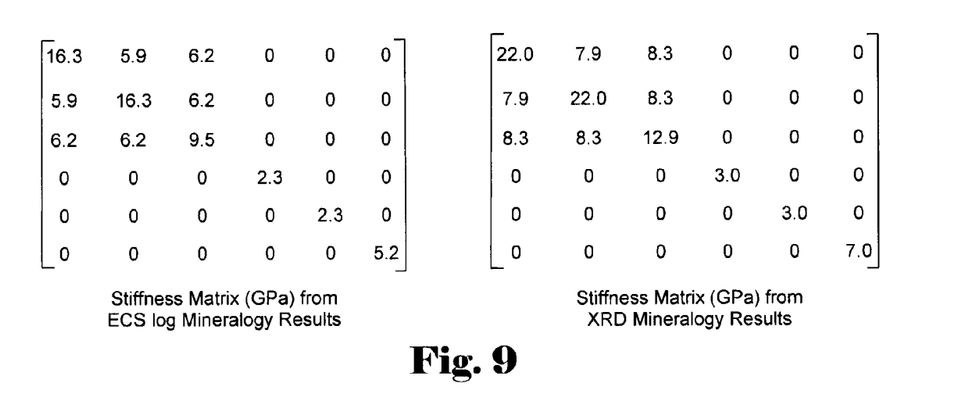
FIG. 9 is a comparison of the stiffness matrix calculated from an ESC log and the stiffness matrix determined from XRD mineralogy results.

A simulation was then conducted using the methodology of the present invention to obtain mechanical properties from the data obtained from the ESC log and the XRD results. FIG. 9 shows a comparison of the stiffness matrix from the ECS log and the stiffness matrix from the XRD mineralogy results. The simulated moduli from the ECS log results were as follows: Eh=12.0 GPA, Ev=6.1 GPA, Vh=0.15 Vv=0.27, and G=2.3 Gpa. The simulated moduli from the XRD mineralogy results were as follows: Eh=16.2 GPA, Ev=8.3 GPA, Vh=0.15 Vv=0.27, and G=3.0 Gpa.

At a depth of 184 feet 10 inches and 165 feet, the mineralogy quantification from XRD and the ESC log were again compared. At these two depths, the XRD results were used to run simulations using the methodology of the present invention to obtain mechanical properties. These results were then compared with the mechanical properties obtained from the sonic log and the UPV results. In order to run the simulation for this set of minerals, kerogen was treated as other clay since Woodford kerogen has a hardness of 550 Mpa which is close to that of soft minerals such as gypsum. The density of kerogen was assumed to be 2 g/cc, an error of 2% was assumed in porosity measurements, and an average error of 3% in percentage of each mineral determined by XRD.

Figure 10:
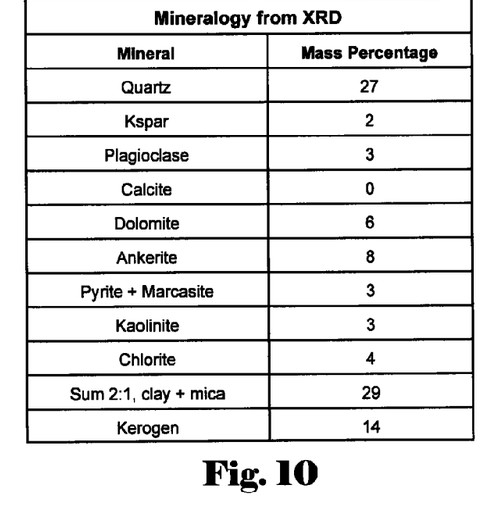
FIG. 10 is a table showing the mass percentage of mineralogy from XRD results.
Figure 11A:
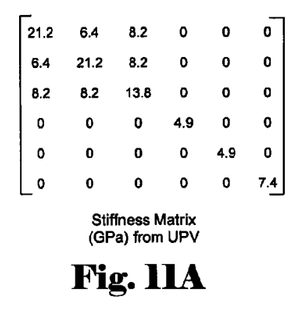
FIG. 11A is a stiffness matrix determined from UPV results.
Figure 11B:
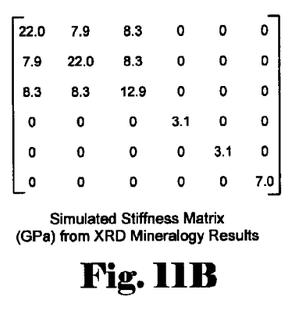
FIG. 11B is a stiffness matrix determined from XRD results.
Figure 11C:
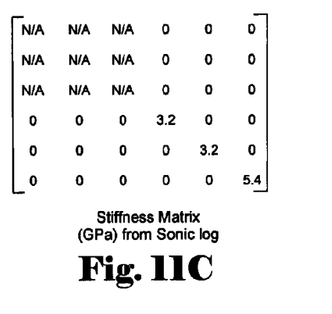
FIG. 11C is a stiffness matrix determined from sonic log results.
Figure 12:
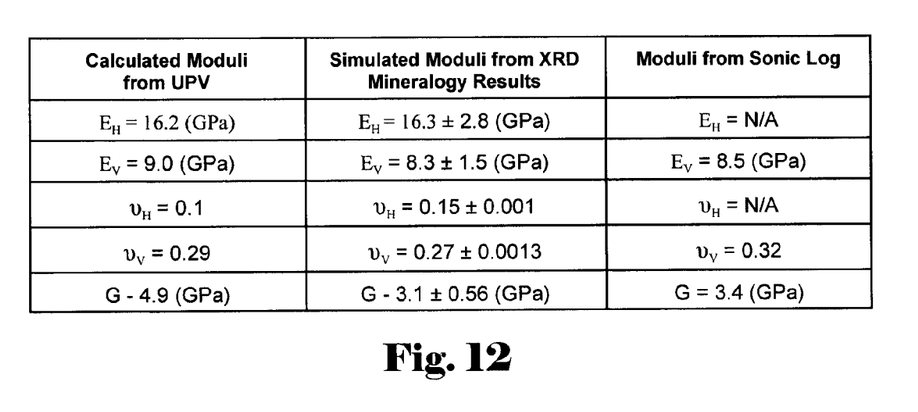
FIG. 12 is a table showing the comparison of engineering moduli.

FIG. 10 shows the mass percentage of mineralogy from the XRD for the 184 feet 10 inch sample, as well as porosity. FIG. 11A shows the stiffness matrix for the UPV results. FIG. 11B shows the stiffness matrix from the XRD results. FIG. 11C shows the stiffness matrix from the sonic log results. A comparison of the engineering moduli is shown in FIG. 12.

Figure 13:
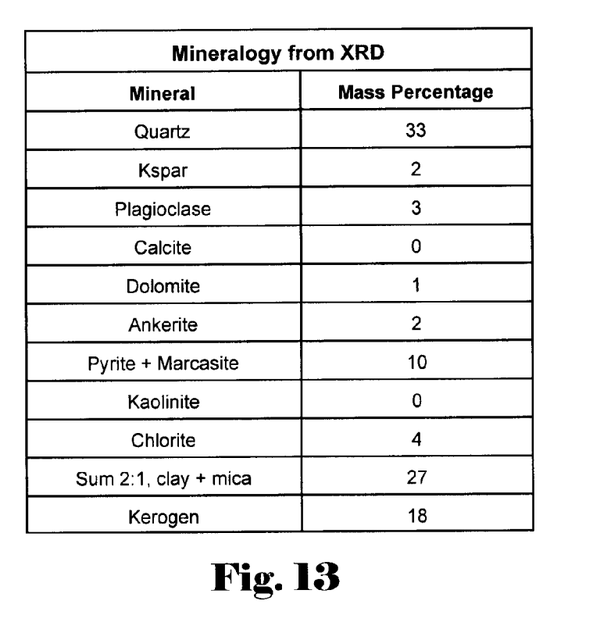
FIG. 13 is a table showing the mass percentage of mineralogy from XRD results.

FIG. 13 shows the mineralogy from the XRD for the 165 feet sample, as well as porosity. FIG. 14A shows the stiffness matrix for the UPV results. FIG. 14B shows the stiffness matrix from the XRD results. FIG. 14C shows the stiffness matrix from the sonic log results. A comparison of the engineering moduli is shown in FIG. 15.

The simulated moduli and parameters using the methodology of the present invention when compared to both lab and log measured moduli and parameters showed excellent agreements. This has opened up a new era where the need for costly core sampling can be substituted by measurements obtained in real time by importing the minerals data and the porosity data obtained from the logging tool 10 into the computer 34 during conventional logging operations.

From the above description, it is clear that the present invention is well adapted to carry out the objects and to attain the advantages mentioned herein, as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method for predicting mechanical properties of a transverse isotropic region of a rock formation traversed by a well bore, comprising:
    measuring, with a logging tool, the mass percentages of minerals present in the formation surrounding the well bore and the porosity of the rock formation surrounding the well bore;
    transmitting, by the logging tool, an electrical signal indicative of the mass percentages of minerals present in the formation and the porosity of the rock formation to a processor executing processor executable code to:
    receive the electrical signal indicative of the mass percentages of minerals present and the porosity of the rock formation surrounding the well bore;
    determine the density of minerals present in the rock formation surrounding the well bore; and
    determine, from the porosity, the measured mass percentages, and the density of the minerals, a set of transverse isotropic elastic coefficients of the rock formation.

2. The method of claim 1, wherein the mass percentages of minerals are measured with a geochemical logging tool.

3. The method of claim 1 wherein the set of elastic coefficients include $C_{11}$, $C_{12}$, $C_{13}$, $C_{33}$, and $C_{44}$.

4. The method of claim 1 wherein the processor executable code, when executed by the processor, further causes the processor to: convert the elastic coefficients into at least one elastic modulus.

5. The method of claim 1 wherein the processor executable code, when executed by the processor, further causes the processor to:
    convert the elastic coefficients into an elastic modulus selected from the group consisting of Young's modulus in isotropic plane, Young's modulus in direction normal to isotropic plane, Poisson's ratio in isotropic plane, Poisson's ratio in direction normal to isotropic plane, and shear modulus.

6. A method for predicting mechanical properties of a transverse isotropic region of a rock formation traversed by a well bore, comprising:
    moving a logging tool through the well bore;
    measuring the mass percentages of minerals present in the rock formation surrounding the well bore and the porosity of the rock formation with the logging tool;
    receiving, by a processor executing processor executable code stored in a non-transitory computer medium, an electrical signal indicative of the mass percentages of minerals present in the rock formation surrounding the well bore and the porosity of the rock formation;
    determining, by the processor, the density of the minerals present in the rock formation surrounding the well bore; and
    determining, by the processor, from the porosity, the measured mass percentages, and the density of the minerals, a set of transverse isotropic elastic coefficients of the rock formation in real time as the logging tool is moved through the well bore.

7. The method of claim 6 wherein the mass percentages of minerals are measured with a geochemical logging tool.

8. The method of claim 6 wherein the set of elastic coefficients include $C_{11}$, $C_{12}$, $C_{13}$, $C_{33}$, and $C_{44}$.

9. The method of claim 6 further comprising:
    converting, by the processor, the elastic coefficients into at least one elastic modulus.

10. The method of claim 6 further comprising:
    converting, by the processor, the elastic coefficients into an elastic modulus selected from the group consisting of Young's modulus in isotropic plane, Young's modulus in direction normal to isotropic plane, Poisson's ratio in isotropic plane, Poisson's ratio in direction normal to isotropic plane, and shear modulus.

11. A computer system for predicting mechanical properties of a transverse isotropic region of rock formations traversed by a well bore, comprising:
    a processor accessing a non-transitory computer readable medium having processor executable instructions stored therein for:
    receiving an electrical signal indicative of the mass percentages of minerals present in the rock formations surrounding the well bore from a logging tool moving through the well bore;
    receiving an electrical signal indicative of the porosity of the rock formation from the logging tool moving through the well bore;
    determining the density of each of the minerals present in the rock formation surrounding the well; and
    determining, from the porosity and the measured mass percentages and density of the minerals, a set of transverse isotropic elastic coefficients of the rock formation in real time as the logging tool is moving through the well bore.

12. The computer system of claim 11 further comprising instructions for:
    converting the elastic coefficients into at least one elastic modulus.

13. The computer system of claim 11 further comprising instructions for:
    converting the elastic coefficients into an elastic modulus selected from the group consisting of Young's modulus in isotropic plane, Young's modulus in direction normal to isotropic plane, Poisson's ratio in isotropic plane, Poisson's ratio in direction normal to isotropic plane, and shear modulus.

14. A computer program stored on a non-transitory computer readable medium for predicting mechanical properties of a transverse isotropic region of rock formations traversed by a well bore, the computer program comprising instructions for causing a processor to:

receive an electrical signal indicative of the mass percentages of minerals present in the rock formations surrounding the well bore and the porosity of the rock formations from a logging tool moving through the well bore;

determine the density of each of the minerals present in the rock formation surrounding the well; and determine, from the porosity and the measured mass percentages and density of the minerals, a set of transverse isotropic elastic coefficients of the rock formation.

15. The computer program of claim 14 further comprising instructions for causing the processor to:

convert the elastic coefficients into at least one elastic modulus.

16. The computer program of claim 14 further comprising instructions for causing the processor to:

convert the elastic coefficients into an elastic modulus selected from the group consisting of Young's modulus in isotropic plane, Young's modulus in direction normal to isotropic plane, Poisson's ratio in isotropic plane, Poisson's ratio in direction normal to isotropic plane, and shear modulus.

* * * * *

UNITED STATES PATENT AND TRADEMARK OFFICE
CERTIFICATE OF CORRECTION

PATENT NO. : 8,380,437 B2
APPLICATION NO. : 12/106899
DATED : February 19, 2013
INVENTOR(S) : Younane Abouseliman et al.

It is certified that error appears in the above-identified patent and that said Letters Patent is hereby corrected as shown below:

In the Specifications:

Column 3, line 9: Delete "(CI)," and replace with -- (Cl), --

Column 5, line 7: Delete "D." and replace with -- Φ --

Signed and Sealed this
Twenty-third Day of April, 2013

Teresa Stanek Rea
*Acting Director of the United States Patent and Trademark Office*